United States Patent [19]
Yoshino et al.

[11] Patent Number: 5,563,203
[45] Date of Patent: Oct. 8, 1996

[54] SILICONE RUBBER COMPOSITIONS AND CURED PRODUCTS THEREOF

[75] Inventors: Masachika Yoshino; Naoki Omura; Terukazu Sato, all of Annaka; Masayuki Yoshida, Tomioka, all of Japan

[73] Assignee: Shin-Etsu Chemical Co., Ltd., Tokyo, Japan

[21] Appl. No.: 339,665

[22] Filed: Nov. 14, 1994

Related U.S. Application Data

[63] Continuation-in-part of Ser. No. 205,303, Mar. 3, 1994, abandoned.

[30]    Foreign Application Priority Data

Mar. 4, 1993 [JP] Japan ................................. 5-069309

[51] Int. Cl.$^6$ ............................................... C08L 83/00
[52] U.S. Cl. ....................... 524/493; 524/588; 525/477; 525/478
[58] Field of Search ............................. 524/588, 493; 525/477, 478

[56]    References Cited

U.S. PATENT DOCUMENTS

| | | | |
|---|---|---|---|
| 4,500,659 | 2/1985 | Kroupa et al. | 524/862 |
| 4,800,124 | 1/1989 | Davis et al. | 428/391 |
| 4,929,669 | 5/1990 | Jensen | 524/861 |
| 5,240,984 | 8/1993 | Takahashi et al. | 524/266 |

*Primary Examiner*—Melvyn I. Marquis
*Assistant Examiner*—Karen A. Dean
*Attorney, Agent, or Firm*—Millen, White, Zelano & Branigan, P.C.

[57]    ABSTRACT

A silicone rubber composition is prepared by mixing 100 parts by weight of an alkenyl-containing organopolysiloxane having a degree of polymerization of at least 3,000 and 5 to 30 parts by weight of finely divided silica having a specific surface of at least 50 m$^2$/g with 0.5 to 10 parts by weight of an organopolysiloxane resin having a weight average molecular weight of 500 to 50,000, a OH group content of 0.0001 to 0.01 mol/g, and a liquefying temperature of 50° to 150° C., at a temperature above the liquefying temperature of the resin. The composition has high plasticity in an uncured base compound form and is effective for extrusion molding. The composition cures into silicone rubber having low hardness, good flexibility and excellent physical properties, finding a variety of applications.

17 Claims, No Drawings

SILICONE RUBBER COMPOSITIONS AND CURED PRODUCTS THEREOF

CROSS REFERENCE TO RELATED APPLICATION

This application is a continuation-in-part of application Ser. No. 08/205,303 filed on Mar. 3, 1994, now abandoned, the entire contents of which are hereby incorporated by reference.

BACKGROUND OF THE INVENTION

1. Field of the Invention

This invention relates to a silicone rubber composition which has high plasticity in a base compound form, is suitable as extrusion molding material, and can be molded and cured into products having low hardness.

2. Prior Art

Silicone rubbers which are cured products of silicone rubber compositions are improved in heat resistance, weather resistance, durability, releasability and electrical properties and formable or moldable to any desired shape. They have found a wide variety of uses as building materials, electric and electronic parts, automobile parts and business machine parts. For automatic low-cost manufacture of such parts in a large scale, a continuous extrusion molding/heat curing process of extruding a silicone rubber composition through an extruder and continuously passing the extrudate through a hot air oven for heat curing is currently widely accepted.

There is a great demand for silicone rubber compositions for extrusion molding. Silicone rubber compositions with low loading of filler and curing into low hardness (JIS A scale hardness 40 or lower) silicone rubbers having excellent flexibility and rubber elasticity are now on the verge of industrial use. These silicone rubber compositions, however, have a problem associated with low loading of filler that rubber compound in uncured state is low in plasticity and difficult to work during extrusion molding. This problem must be solved for low cost manufacture.

SUMMARY OF THE INVENTION

Therefore, an object of the present invention is to provide a novel and improved silicone rubber composition which has high plasticity in an uncured base compound form, is suitable for extrusion molding, and can be molded and cured into silicone rubber products having low hardness, especially a JIS A scale hardness (according to JIS K 6301) of 40 or less.

The inventors have found that when a base compound containing 100 parts by weight of an organopolysiloxane (raw rubber) of the general formula (1) having a degree of polymerization of at least 3,000 and 5 to 30 parts by weight of finely divided silica having a specific surface area of at least 50 m²/g is combined with 0.5 to 10 parts by weight of an organopolysiloxane resin of the general formula (2) having a weight average molecular weight of 500 to 50,000 and a liquefying temperature of 50° to 150° C., and they are mixed at a temperature above the liquefying temperature of the organopolysiloxane resin of formula (2), the resulting base compound has high plasticity in an uncured state and is thus easily workable. There is obtained a silicone rubber composition suited for extrusion molding. When a vulcanizing agent is added to this base compound, it cures into silicone rubber having excellent physical properties including hardness, elongation and tensile strength.

$$R_a^1 SiO_{(4-a)/2} \tag{1}$$

In formula (1), $R^1$ is a monovalent substituted or unsubstituted hydrocarbon group, 0.0001 to 0.5 mol % of $R^1$ being an alkenyl group, and letter a is a number of 1.95 to 2.05.

$$R_m^2 (OH)_n SiO_{(4-m-n)/2} \tag{2}$$

In formula (2), $R^2$ is a monovalent substituted or unsubstituted hydrocarbon group, letter m is a number of 0.8 to 1.2, and n is a number of 0.12 to 0.18.

According to the present invention, there is provided an extrusion-moldable silicone rubber composition comprising (A) 100 parts by weight of an organopolysiloxane of formula (1) having a degree of polymerization of at least 3,000, (B) 0.5 to 10 parts by weight of an organopolysiloxane resin of formula (2) having a weight average molecular weight of 500 to 50,000, a OH group content of 0.0001 to 0.01 mol/g of the organopolysiloxane resin, and a liquefying temperature of 50° to 150° C., and (C) 5 to 30 parts by weight of finely divided silica having a specific surface area of at least 50 m²/g, the components being mixed at a temperature above the liquefying temperature of component (B). Also contemplated herein is a silicone rubber cured product obtained by curing the silicone rubber composition, and having a hardness of 40 or less on JIS A scale according to JIS K 6301 using Spring Type Hardness Tester Type A.

DETAILED DESCRIPTION OF THE INVENTION

Main components of the silicone rubber composition according to the present invention are (A) an organopolysiloxane of formula (1) having a degree of polymerization of at least 3,000, and (B) an organopolysiloxane resin of formula (2) having a weight average molecular weight of 500 to 50,000, a OH group content of 0.0001 to 0.01 mol/g of the resin, and a liquefying temperature of 50° to 150° C.

component (A) is an organopolysiloxane of the general compositional formula (1):

$$R_a^1 SiO_{(4-a)/2} \tag{1}$$

wherein $R^1$ is a substituted or unsubstituted monovalent hydrocarbon group. It is necessary that 0.0001 to 0.5 mol %, preferably 0.01 to 0.3 mol % of the $R^1$ groups is an alkenyl group such as vinyl and allyl groups. Organopolysiloxanes with an alkenyl group content of less than 0.0001 mol % are less curable whereas with an alkenyl content of more than 0.5 mol %, silicone rubber compositions cure to silicone rubbers having too high hardness and poor properties of elongation and tensile strength.

The monovalent hydrocarbon groups represented by $R^1$ other than the alkenyl group are those having 1 to 10 carbon atoms, for example, alkyl groups such as methyl, ethyl, propyl, butyl, pentyl, hexyl, octyl, decyl and dodecyl groups; aryl groups such as phenyl and tolyl groups; aralkyl groups such as β-phenylethyl group; and substituted ones thereof in which some or all of the hydrogen atoms attached to carbon atoms are replaced by halogen atoms (e.g., fluorine), cyano and other groups, such as cyanoethyl and 3,3,3-trifluoropropyl groups. Most often the methyl group is used although 1 to 20 mol % of phenyl group may be contained in $R^1$ where silicone rubber cured products are required to be low-temperature resistant and transparent.

Inclusion of 10 to 50 mol % of cyanoethyl and 3,3,3-trifluoropropyl groups is also preferred where oil resistance and gasoline resistance are required.

Letter a is a positive number of from 1.95 to 2.05 and most often a number approximate to 2. With a of less than 1.95, it is difficult to synthesize an organopolysiloxane having a degree of polymerization of at least 3,000. With a of more than 2.05, it is difficult to synthesize an organopolysiloxane having a degree of polymerization of at least 3,000 in a reproducible consistent manner.

Component (A) should preferably have a degree of polymerization of at least 3,000, especially 5,000 to 10,000 for good processability and extrusion property before curing and satisfactory mechanical strength of the cured product.

The organopolysiloxane is essentially composed of diorganopolysiloxane units although minor proportions of triorganosiloxy, mono-organosiloxy and $SiO_2$ units may be present. Also it may be blocked with a hydroxyl group or triorganosiloxy unit such as dimethylvinylsiloxy group, trimethylsiloxy group and the like at a molecular chain end.

The organopolysiloxanes may be used alone or in admixture of two or more.

Component (B) is an organopolysiloxane resin having a weight average molecular weight of 500 to 50,000, containing 0.0001 to 0.01 mol of a OH group per gram of the resin, and having a liquefying temperature of 50° to 150° C. It is solid at room temperature if not dissolved in a solvent such as toluene and benzene. It has the general compositional formula (2):

$$R_m^2(OH)_n SiO_{(4-m-n)/2} \qquad (2)$$

wherein $R^2$ is a monovalent substituted or unsubstituted hydrocarbon group having 1 to 10 carbon atoms, letter m is a number of 0.8 to 1.2, and n is a number of 0.12 to 0.18. The hydrocarbon groups represented by $R^2$ are as defined for $R^1$. Elimination of a functional group participating in crosslinking of silicone rubber such as Si—H and Si—CH=$CH_2$ groups is desired in order that worked (cured) products in the form of silicone rubber have moderate rubber hardness. Then preferred $R^2$ groups are methyl, ethyl, isopropyl, phenyl and trifluoropropyl groups. It is understood that the $R^2$ groups in formula (2) may be identical or different.

The content of OH groups in the resin should be in a range of 0.0001 to 0.01 mol, preferably 0.0005 to 0.005 mol per gram of resin. If the content of OH groups is less than 0.0001 mol/g, finely divided silica filler would not be evenly dispersed into the compound. If the content of OH groups is more than 0.01 mol/g, the compound would increase in stickiness and the plasticity-improving effect would be lowered.

The organopolysiloxane resin can be prepared by the conventional cohydrolysis and polymerization method. The organopolysiloxane resin is composed of any one or more of M unit ($R_3^2SiO_{1/2}$), D unit ($R_2^2SiO$) T unit ($R^2SiO_{3/2}$) and Q unit ($SiO_2$). Preferably, the organopolysiloxane resin is mainly composed of T unit and more preferably consists essentially of T unit. As component (B), KR 220 which is commercially available from Shin-Etsu Chemical Co., Ltd. may be used.

Component (B) is blended in an amount of 0.5 to 10 parts, more preferably 2 to 8 parts by weight per 100 parts by weight of component (A). Silicone rubber compounds with less than 0.5 parts of component (B) would not have fully increased plasticity whereas those with more than 10 parts of component (B) would increase in stickiness, resulting in poor roll workability and extrusion moldability because the compound would stick on a roll and an extruder, and cure into products with poor physical properties.

Component (C) is finely divided silica which has a specific surface area of at least 50 $m^2/g$, preferably 100 to 400 $m^2/g$ for imparting adequate hardness to the silicone rubber and improving mechanical strength such as tensile strength. Examples of the finely divided silica include fumed silica and precipitated silica, alone or in admixture of two or more. The silica may be surface treated with linear organopolysiloxanes, cyclic organopolysiloxanes, hexamethyldisilazane, dichlorodimethylsilane, etc.

The silica powder is preferably added in an amount of 5 to 30 parts, preferably 5 to 25 parts, more preferably 10 to 30 parts by weight per 100 parts by weight of component (A) or organopolysiloxane. Less than 5 parts by weight of silica would give an insufficient strength of the resulting silicone rubber. More than 30 parts by weight of silica would give a high hardness of the resulting silicone rubber.

According to the present invention, there is obtained a silicone rubber composition having high plasticity in an uncured state and being capable of extrusion molding even if the composition contains a low content of finely divided silica filler and thus cures into a product having a JIS A scale hardness of 40 or less. The conventional silicone rubber compositions containing 30 parts by weight or less of finely divided silica fillers per 100 parts by weight of an organopolysiloxane raw rubber such as component (A) are difficult to extrusion mold because of low plasticity. In the present invention, by the addition of the organopolysiloxane resin (B) in a particular amount, a silicone rubber composition containing a small amount of finely divided silica filler can be extrusion molded. In this case, if the organopolysiloxane resin (B) is added in a larger amount, the composition cannot be easily extrusion molded, as described above.

The composition of the present invention may further contain any of various well-known rubber additives commonly blended in conventional silicone rubber compositions, for example, ground silica, diatomaceous earth, iron oxide, zinc oxide, titanium oxide, carbon black, barium oxide, magnesium oxide, cerium hydroxide, calcium carbonate, magnesium carbonate, zinc carbonate, asbestos, glass wool, fine mica, fused silica powder and the like in such amounts that the object of the present invention may not be impaired. Further, pigments, dyes, anti-aging agents, antioxidants, antistatic agents, flame retardants (e.g., antimony oxide and chlorinated paraffin), and heat transfer enhancers (e.g., boron nitride and aluminum oxide) may be blended if desired.

The silicone rubber composition of the present invention may be prepared by any desired method, preferably by charging a milling means such as a kneader with components, (A) organopolysiloxane, (B) organopolysiloxane resin, and (C) finely divided silica, blending the ingredients at room temperature, and heat treating the blend at a temperature above the liquefying temperature of component (B), typically at 120° to 200° C. for about 1 to 10 hours. If desired, a catalyst such as ammonium carbonate, stearic acid, zinc stearate, and copper dioctanoate may be added in order to promote dehydration condensation between a silanol group of the organopolysiloxane resin (B) and a silanol group present at the surface of silica particles (C).

For curing the silicone rubber composition of the invention, either of conventional well-known methods including utilization of hydrosilylation reaction and vulcanization by organic peroxide catalysts may be used.

In curing the silicone rubber composition by utilizing hydrosilylation reaction, a curing agent of organohydrogenpolysiloxane combined with a platinum group metal catalyst is used. The organohydrogenpolysiloxane used herein may be a linear, cyclic or branched organopolysiloxane having at least two SiH groups in a molecule while the SiH groups may be at the end or an intermediate of the polysiloxane chain. The organohydrogenpolysiloxane should preferably have a viscosity of 300 cs or less at 25° C. The organohydrogenpolysiloxane is preferably used in such an amount that there is 0.5 to 3 mol, especially 1 to 2 mol of SiH group per mol of the alkenyl group in component (A).

The platinum group metal catalyst used concurrently therewith may be selected from well-known ones, for example, the finely divided metallic platinum catalyst described in U.S. Pat. No. 2,970,150, the chloroplatinic acid catalyst described in U.S. Pat. No. 2,823,218, the platinum-hydrocarbon complex compounds described in U.S. Pat. Nos. 3,159,601 and 3,159,662, the chloroplatinic acid-olefin complex compound described in U.S. Pat. No. 3,516,946, and the platinum-vinyl siloxane complex described in U.S. Pat. Nos. 3,775,452 and 3,814,780. The platinum group metal catalyst is preferably used in such an amount that there is 0.1 to 1,000 parts, especially 1 to 100 parts by weight of metallic platinum per million parts by weight of the total of the organopolysiloxane (A) and the organohydrogenpolysiloxane. On curing, a reaction control agent such as methylvinylcyclotetrasiloxane and acetylene alcohol may be added in order to improve shelf stability at room temperature and to provide an adequate pot life.

Curing by hydrosilylation reaction is effected by heating at a temperature of about 60 to 400° C. for about 1 minute to about 5 hours.

Alternatively, the silicone rubber composition is vulcanized in the presence of an organic peroxide catalyst. The organic peroxide may be selected from those commonly used in the curing of peroxide curing type silicone rubbers, for example, benzoyl peroxide, bis(2,4-dichlorobenzoyl) peroxide, di-t-butyl peroxide, 2,5-dimethyl-di-t-butylperoxy-hexane, t-butylperbenzoate, t-butylperoxy-isopropyl-carbonate, and dicumyl peroxide, alone or in admixture of two or more. The organic peroxide is preferably added in an amount of about 0.01 to 3 parts, more preferably about 0.05 to 1 part by weight per 100 parts by weight of the organopolysiloxane (A). With the aid of such peroxides, the silicone rubber compositions of the invention can be cured by heating at a temperature of about 100° to 400° C. for about 1 minute to about 5 hours.

In this way, cured silicone rubber products having a low hardness are obtained. In this case, the cured silicone rubber products should preferably have a JIS A hardness of 40 or less. Irrespective of the low hardness of silicone rubbers, the silicone rubber compounds themselves have a high Williams plasticity so that they are useful as extrusion molding materials for the fabrication of building gaskets, facsimile rolls, medical tubes and the like. They are also useful in the fabrication of rubber contacts, nipples, synchro-joint boots, plug boots, anode caps, and insulated wires.

The silicone rubber composition of the present invention has an improved plasticity and gives a molding having a high green strength. It does not stick on a roll of kneader and an extruder, and has an excellent extrudability. Therefore, the continuous molding is very easy. The extrudate is vulcanized by normal pressure hot air vulcanization (HAV), continuous steam vulcanization (CV), high temperature liquid vulcanization (HLV) and the like to prepare a molding having various configuration and size.

EXAMPLE

Examples of the present invention are given below by way of illustration and not by way of limitation. All parts are by weight. GPC is gas permeation chromatography.

Example 1

To 100 parts of an organopolysiloxane consisting of 99,825 mol % of a dimethylsiloxy unit, 0.15 mol % of a methylvinylsiloxy unit, and 0.025 mol % of a dimethylvinylsiloxy unit and having a weight average degree of polymerization of 8,000 were added 5 parts of a methylsiloxane resin consisting of a $CH_3SiO_{3/2}$ unit, having an average molecular weight of 3,000 as measured by GPC on a styrene basis, containing 0.0023 mol/ gram of a silanol group, and having a liquefying temperature of 81° C. and 20 parts of fumed silica having a specific surface area of 200 $m^2/g$ (Aerosil 200, Nippon Aerosil K. K.). They were kneaded in a kneader and heat treated at 180° C. for 3 hours, obtaining a base compound I.

Example 2

A base compound II was prepared by the same procedure as Example 1 except that 5 parts of the methylsiloxane resin in Example 1 was replaced by 5 parts of a phenylsiloxane resin consisting of a $C_6H_5SiO_{3/2}$ unit, having a weight average molecular weight of 2,500 as measured by GPC on a styrene basis, containing 0.0035 mol/gram of a silanol group, and having a liquefying temperature of 73° C.

Example 3

A base compound III was prepared by the same procedure as Example 1 except that 5 parts of the methylsiloxane resin in Example 1 was replaced by 5 parts of a siloxane resin consisting of 20 mol % of a $CH_3(CH_2)_2SiO_{3/2}$ unit and 80 mol % of $C_6H_5SiO_{3/2}$, having a weight average molecular weight of 2,800 as measured by GPC on a styrene basis, containing 0.0032 mol/gram of a silanol group, and having a liquefying temperature of 78° C.

Comparative Example 1

A base compound IV was prepared by the same procedure as Example 1 except that 5 parts of the methylsiloxane resin in Example 1 was replaced by 4.5 parts of a silanol-terminated dimethylpolysiloxane having a degree of polymerization of 10.

According to JIS C-2123, the base compounds I to IV were measured for Williams plasticity by kneading each compound again for 10 minutes, placing a weight thereon, and measuring the height of the weight after 3 minutes by means of a dial gage. The results are shown in Table 1.

To 100 parts of each base compound was added 0.6 parts of 2,4-dichlorobenzoyl peroxide. The composition was uniformly blended, press vulcanized at 120° C. for 10 minutes, and post vulcanized at 200° C. for 4 hours, obtaining a vulcanized rubber sheet. The rubber sheet was measured for cured physical properties according to JIS K-6301. The results are shown in Table 1.

Separately, each base compound having the vulcanizing agent added thereto was fed to an extruder equipped with a cylinder having a diameter of 40 mm/10 mm and a length/diameter (L/D) ratio of 12 and a die having a diameter of 20 mm/10 mm. A silicone rubber extrudate in the form of a cylindrical rod with an outer diameter of 5 mm was continuously extruded from the extruder at room temperature (15° to 30° C.) and at a rate of 1 m/min. It was then passed at a rate of 1 m/min. through a heating oven having a total length of 2 meters in which hot air at 300° C. was circulated. Extrusion moldability was visually inspected and labeled "○" when a cylindrical rod extrudate was obtained with good shape retention and "X" when the shape was not retained and no shape extrudate was obtained. The results are shown in Table 1.

TABLE 1

| Example Compound | Example 1 I | Example 2 II | Example 3 III | Comparative Example 1 IV |
|---|---|---|---|---|
| Williams plasticity | 190 | 230 | 210 | 110 |
| Cured physical properties | | | | |
| Hardness, JIS A | 32 | 31 | 34 | 33 |
| Elongation, % | 700 | 690 | 640 | 690 |
| Tensile strength, kgf/cm² | 82 | 78 | 75 | 76 |
| Extrusion molding | O | O | O | X |

Examples 4 and 5, Comparative Examples 2 and 3

Example 2 was repeated except that the phenylsiloxane resin was blended in an amount of 2 parts (Example 4), 8 parts (Example 5), 13 parts (Comparative Example 2) or 23 parts (Comparative Example 3).

The test results are shown in Table 2.

Comparative Example 4

Example 2 was repeated except that 5 parts of the phenylsiloxane resin was replaced by 5 parts by weight of a phenylsiloxane resin consisting of a $C_6H_5SiO_{3/2}$, having a weight average molecular weight of 3,200 as measured by GPC on a styrene basis, containing 0.015 mol/gram of a silanol group, and having a liquefying temperature of 84°C.

The test results are also shown in Table 2.

TABLE 2

| Example | Example 4 | Example 5 | Comparative Example 2 | Comparative Example 3 | Comparative Example 4 |
|---|---|---|---|---|---|
| Williams plasticity | 205 | 220 | 185 | 170 | 145 |
| Cured physical properties | | | | | |
| Hardness, JIS A | 31 | 32 | 31 | 30 | 30 |
| Elongation, % | 710 | 620 | 670 | 690 | 740 |
| Tensile strength, kgf/cm² | 83 | 86 | 78 | 76 | 79 |
| Extrusion molding | O | O | X | X | X |

The composition of Comparative Example 2 slightly stuck on the roll of the kneader in the kneading step and also stuck on the die of the extruder. The resulting extrudate did not have a cylindrical rod form.

The composition of Comparative Example 3 remarkably stuck on the roll of the kneader in the kneading step and could not be extruded because of the stickiness to the die of the extruder.

The composition of Comparative Example 4 slightly stuck on the roll, had an inferior extrudability, and gave a remarkable die swelling.

There has been described a silicone rubber composition which has high plasticity in an uncured base compound form and is effective for extrusion molding. The composition cures into silicone rubber having low hardness, good flexibility and excellent physical properties, finding a variety of applications.

Although some preferred embodiments have been described, many modifications and variations may be made thereto in the light of the above teachings. It is therefore to be understood that within the scope of the appended claims, the invention may be practiced otherwise than as specifically described.

We claim:

1. An extrusion-moldable silicone rubber composition comprising:

(A) 100 parts by weight of an organopolysiloxane of formula (1):

$$R_a^1SiO_{(4-a)/2} \tag{1}$$

wherein $R^1$ is a monovalent substituted or unsubstituted hydrocarbon group, 0.0001 to 0.5 mol % of $R^1$ being an alkenyl group, and letter a is a number of 1.95 to 2.05, said organopolysiloxane of formula (1) having a degree of polymerization of at least 3,000;

(B) 0.5 to 10 parts by weight of an organopolysiloxane resin of formula (2):

$$R_m^2(OH)_nSiO_{(4-m-n)/2} \tag{2}$$

wherein $R^2$ is a monovalent substituted or unsubstituted hydrocarbon group, letter m is a number of 0.8 to 1.2, and n is a number of 0.12 to 0.18, said organopolysiloxane resin having a weight average molecular weight of 500 to 50,000, containing 0.0001 to 0.01 mol of a OH group per gram of said organopolysiloxane resin, and having a liquefying temperature of 50° to 150° C.; and (C) 5 to 30 parts by weight of finely divided silica having a specific surface area of at least 50 m²/g;

components (A), (B) and (C) being mixed at a temperature above the liquefying temperature of component (B).

2. A silicone rubber cured product obtained by hydrosilylation curing, using a curing agent and a platinum group metal catalyst, or by vulcanization, using an organic peroxide catalyst, of a composition according to claim 1.

3. A silicone rubber composition according to claim 1, wherein said organopolysiloxane component (A) has a degree of polymerization of 5,000 to 10,000.

4. A silicone rubber composition according to claim 1, wherein said organopolysiloxane resin component (B) is blended in an amount of 0.5 to 8 parts by weight per 100 parts by weight of component (A).

5. A silicone rubber composition according to claim 1, further comprising an organic peroxide for curing.

6. A silicone rubber composition according to claim 1, further comprising an organohydrogenpolysiloxane and a platinum group metal catalyst for curing.

7. A silicone rubber composition according to claim 1, wherein said 0.0001–0.5 mole % of alkenyl groups for $R^1$ are, in each case, vinyl or allyl and the remainder of the $R^1$ groups are, in each case, a monovalent hydrocarbon group of 1–10 C atoms which is unsubstituted or substituted by halogen atoms or cyano groups, and $R^2$ is a monovalent hydrocarbon group of 1–10 C atoms which is unsubstituted or substituted by halogen atoms or cyano groups.

8. A silicone rubber composition according to claim 7, wherein said remainder of $R^1$ groups are, in each case, methyl, ethyl, propyl, butyl, pentyl, hexyl, octyl, decyl, dodecyl, phenyl, tolyl, β-phenylethyl, cyanoethyl or 3,3-trifluoropropyl.

9. A silicone rubber composition according to claim 8, wherein 1–20 mole % of $R^1$ groups are phenyl.

10. A silicone rubber composition according to claim 8, wherein 10–50 mole % of $R^1$ groups are cyanoethyl or 3,3-trifluoropropyl.

11. A silicone rubber composition according to claim 4, wherein said 0.0001–0.5 mole % of alkenyl groups for $R^1$ are, in each case, vinyl or allyl and the remainder of the $R^1$ groups are, in each case, a monovalent hydrocarbon group of 1–10 C atoms which is unsubstituted or substituted by halogen atoms or cyano groups, and $R^2$ is a monovalent hydrocarbon group of 1–10 C atoms which is unsubstituted or substituted by halogen atoms or cyano groups.

12. A silicone rubber composition according to claim 1, wherein said finely divided silica component (C) has a specific surface area of 100–400 m²/g.

13. A silicone rubber composition according to claim 1, wherein said composition contains 2–8 parts by weight of component (B) per 100 parts by weight of component (A).

14. A method of preparing a silicone rubber composition comprising:

combining the following components to form a mixture:
(A) 100 parts by weight of an organopolysiloxane of formula (1):

   (1)

wherein $R^1$ is a monovalent substituted or unsubstituted hydrocarbon group, 0.0001 to 0.5 mol % of $R^1$ being an alkenyl group, and letter a is a number of 1.95 to 2.05, said organopolysiloxane of formula (1) having a degree of polymerization of at least 3,000;

(B) 0.5 to 10 parts by weight of an organopolysiloxane resin of formula (2):

   (2)

wherein $R^2$ is a monovalent substituted or unsubstituted hydrocarbon group, letter m is a number of 0.8 to 1.2, and n is a number of 0.12 to 0.18, said organopolysiloxane resin having a weight average molecular weight of 500 to 50,000, containing 0.0001 to 0.01 mol of a OH group per gram of the organopolysiloxane resin, and having a liquefying temperature of 50° to 150° C.; and (C) 5 to 30 parts by weight of finely divided silica having a specific surface area of at least 50 m²/g; and heating the resultant mixture at a temperature above the liquefying temperature of component (B).

15. A method according to claim 14, wherein said 0.0001–0.5 mole % of alkenyl groups for $R^1$ are, in each case, vinyl or allyl and the remainder of the $R^1$ groups are, in each case, a monovalent hydrocarbon group of 1–10 C atoms which is unsubstituted or substituted by halogen atoms or cyano groups, and $R^2$ is a monovalent hydrocarbon group of 1–10 C atoms which is unsubstituted or substituted by halogen atoms or cyano groups.

16. A method according to claim 14, further comprising adding a catalyst to promote dehydration condensation between silanol groups of component (B) and silanol groups present on the surface of silica particles component (C).

17. A method according to claim 15, further comprising adding a catalyst to promote dehydration condensation between silanol groups of component (B) and silanol groups present on the surface of silica particles component (C).

\* \* \* \* \*